United States Patent
Uchida

(12) 
(10) Patent No.: US 6,272,024 B2
(45) Date of Patent: Aug. 7, 2001

(54) D.C.-TO-D.C. CONVERTER HAVING AN IMPROVED SURGE SUPPRESSOR

(75) Inventor: Akihiro Uchida, Ooi-machi (JP)

(73) Assignee: Sanken Electric Co., Ltd., Saitama-ken (JP)

( * ) Notice: Subject to any disclaimer, the term of this patent is extended or adjusted under 35 U.S.C. 154(b) by 0 days.

(21) Appl. No.: 09/734,145

(22) Filed: Dec. 11, 2000

(30) Foreign Application Priority Data

Dec. 27, 1999 (JP) .................................................. 11-371259
Oct. 2, 2000 (JP) .................................................. 12-302294

(51) Int. Cl.[7] .......................... H02M 3/335; H02M 7/122
(52) U.S. Cl. ........................................ 363/21.12; 363/56.09
(58) Field of Search ................................. 363/20, 21.01, 363/21.12, 56.01, 56.09, 56.12, 95, 97, 131; 361/3, 8, 9, 10

(56) References Cited

U.S. PATENT DOCUMENTS

| | | | |
|---|---|---|---|
| 4,271,460 | * 6/1981 | Baker ..................................... | 363/49 |
| 4,334,254 | * 6/1982 | Baker et al. ............................. | 361/9 |
| 4,432,032 | * 2/1984 | Baker et al. .......................... | 361/111 |
| 5,260,607 | * 11/1993 | Kinbara ................................ | 307/253 |

FOREIGN PATENT DOCUMENTS 1-127388   8/1989   (JP) .

* cited by examiner

*Primary Examiner*—Matthew Nguyen
(74) *Attorney, Agent, or Firm*—Woodcock Washburn Kurtz Mackiewicz & Norris LLP

(57) ABSTRACT

A d.c.-to-d.c. converter of the kind having a step-up or step-down transformer with a primary to be connected to a d.c. power supply via an electronic switch, and a secondary to be connected to a load via a smoothing and rectifying circuit. The voltage being applied to the load is detected and fed back to a switch control circuit whereby the switch is controlled to keep constant the converter output voltage. Connected in parallel with the transformer primary, a surge suppressor circuit has a serial connection of a surge-absorbing capacitor and a rectifying diode and a resistor for absorbing a surge developing across the transformer primary winding each time the switch is turned off. In order to attenuate the high-frequency ringing of the voltage across the switch due to the leakage inductance and stray capacitance of the transformer primary and to the stray capacitance of the switch, the reverse recovery time of the diode of the surge suppressor circuit is made longer than half the cycle of the ringing voltage and shorter than the expected minimum non-conducting period of the switch.

10 Claims, 9 Drawing Sheets

D.C.-TO-D.C. CONVERTER HAVING AN IMPROVED SURGE SUPPRESSOR

BACKGROUND OF THE INVENTION

This invention relates to an electronic circuit to be connected between a direct-current (d.c.) power supply and a load for converting one d.c. voltage into another preparatory to application to the load. More specifically the invention concerns improvements in such a d.c.-to-d.c. converter, particularly relating to a surge suppressor circuit, sometimes referred to as snubber circuit in the art, that is customarily incorporated with the converter.

Japanese Unexamined Utility Model Publication No. 1-127388 is hereby cited as describing and claiming a surge suppressor circuit in a d.c.-to-d.c. converter. A typical prior art d.c.-to-d.c. converter of this type (shown in FIG. 1 of the drawings attached hereto) includes a step-up or step-down transformer having a primary winding to be connected to a d.c. power supply via an electronic switching device, and a secondary winding connected via a rectifying and smoothing circuit to a pair of converter output terminals between which is to be connected a load to be powered. A voltage detector circuit is also connected between the pair of converter output terminals for detecting the converter output voltage. The output from the voltage detector circuit is applied to a control circuit for the switching device. The control circuit responds to the voltage detector output by making on-off control of the switching device accordingly, keeping constant the converter output voltage.

As taught by the Japanese unexamined utility model application above, the d.c.-to-d.c. converter includes the surge suppressor circuit comprising a diode, a capacitor and a resistor. The capacitor is connected in parallel with the transformer primary via the diode, and the resistor is. connected in parallel with the capacitor.

An inconvenience with the d.c.-to-d.c. converter of the kind in question is that a voltage surge occurs across the transformer primary when the switching device is opened while the transformer primary is carrying a current. Consequently, were it not for the surge suppressor circuit, the sum of the surge voltage and the supply voltage would be applied to the switching device, resulting in its destruction in the worst case. Actually, however, the surge voltage is taken up by the capacitor of the surge suppressor circuit.

A problem left unsolved in this type of d.c.-to-d.c. converter arises from the fact that the transformer primary has a leakage inductance and parasitic or stray capacitance, and that the switching device also has a stray capacitance. The result has been the creation of a ringing circuit that, in cases where the switching device takes the form of a field-effect transistor for example, has caused oscillation of the drain-source voltage of that switching transistor. The ringing frequency is so high that high-frequency noise has been generated which has interfered with the operations of other circuits.

Generally, the d.c. power supply of the converter takes the form of a rectifying and smoothing circuit connected to an alternating current power supply. For elimination of the ringing noise, a relatively high. impedance noise filter has had to be connected to the a.c. power supply, at the costs of the lower efficiency, greater bulk, and higher cost of the converter.

SUMMARY OF THE INVENTION

The present invention seeks to eliminate or attenuate the ringing of a d.c.-to-d.c. converter of the kind defined.

Briefly, the invention may be summarized as a d.c.-to-d.c. converter for feeding a load from a d.c. power supply, comprising a transformer having at least one winding to be connected to a d.c. power via a switching device. A rectifying and smoothing circuit is connected to the output side of the transformer for applying a d.c. output voltage to a load. The switching device is connected to a switch control circuit thereby to be turned on and off at a rate depending upon the converter output voltage, in order to keep that voltage constant.

Also included is a surge suppressor circuit to which the invention particularly concerns. Having a serial connection of a capacitor, diode, and resistor, which is connected in parallel with the transformer winding, the surge suppressor circuit functions to absorb the surge voltage developing across the transformer winding each time the switching device is turned off. The diode has a predetermined reverse recovery time that is longer than half the cycle of a ringing voltage developing in the transformer winding owing to the leakage inductance and stray capacitance of the transformer winding and to the stray capacitance of the switching device and shorter than an expected minimum nonconducting period of the switching device.

Essentially, the present invention is based upon the discovery that the ringing of the prior art d.c.-to-d.c. converter is eliminable by, as set forth in the foregoing summary, making the reverse recovery time of the diode of the surge suppressor circuit longer than half the cycle of the ringing voltage and shorter than the expected minimum nonconducting period of the switching device. Thus, if the ringing cycle is 250 nanoseconds or so, as is usually the case, then the reverse recovery time of the diode according to the invention should be at least about 125 nanoseconds. The expected minimum nonconducting period of the switching device may be about seven microsecond. Thus the reverse recovery time of the diode according to the invention is from about 125 nanoseconds to about seven microseconds, compared to about 100 nanoseconds according to the invention, which is too short to prevent the ringing. More will be said later on this subject.

The surge suppressor circuit according to the invention, incorporating the diode having a longer reverse recovery time than heretofore, functions as follows to suppress the ringing: The capacitor of the surge suppressor circuit will absorb the voltage surging developing across the transformer when the switching device is turned off, as then a current flows into the capacitor through the diode. Reverse biased subsequently, the diode will nevertheless remain conductive throughout its extended reverse recovery time. The capacitor will then remain connected in parallel with the transformer winding for a longer period of time than in the prior art. The noted stray capacitances are in parallel with the capacitor during the reverse recovery, time of the diode, resulting in the suppression or elimination of the ringing due to the leakage inductance and the stray capacitances.

As an additional advantage, as the capacitor discharges through the transformer winding after taking up the surge, the power is recovered on the input or output side of the transformer for higher operating efficiency.

The above and other objects, features and advantages of the invention and the manner of realizing them will become more apparent, and the invention itself will best be understood, from the following description taken together with the attached drawings showing some preferred embodiments of the invention.

DETAILED DESCRIPTION

Prior Art

Figure 1:
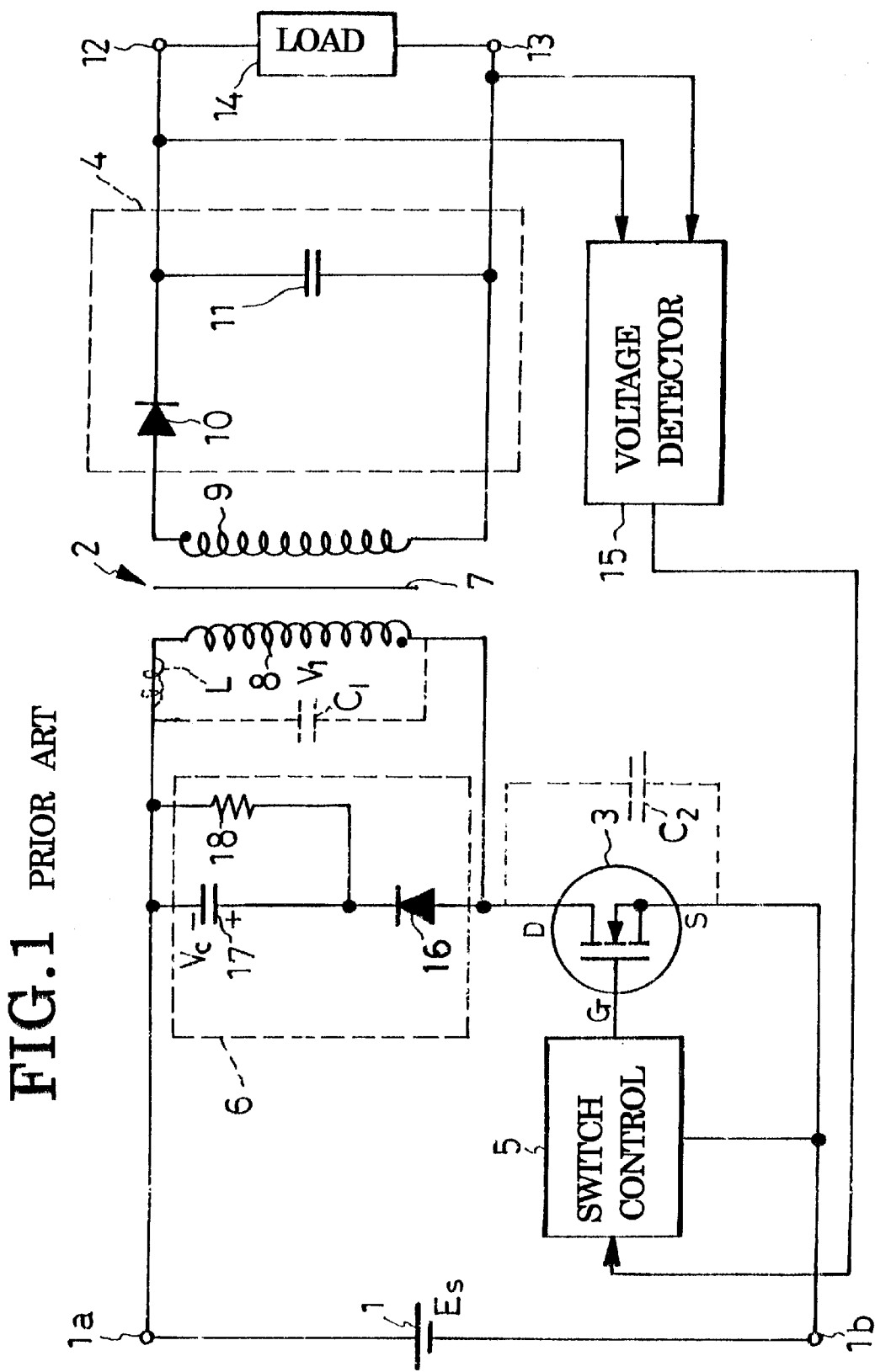
FIG. 1 is a schematic electrical diagram of the prior art d.c.-to-d.c. coverter bearing particular pertinence to the instant invention.

The prior art d.c.-to-d.c. converter in question will be described in some more detail with reference to FIGS. 1–3 in order to make clear how the ringing has occurrred hitherto, and hence how the present invention succeeds in precluding the ringing. As illustrated in FIG. 1, the prior art device has a d.c. power supply 1 such as a rectifying and smoothing circuit connected to an a.c. power supply, a transformer 2, a switching device 3 for on-off control of the d.c. power supply, a rectifying and smoothing circuit 4 for rectifying and smothing the transformer output, a switch control circuit 5 connected to a control input of the switching device 3, and a surge suppressor circuit 6.

The transformer 2 has a primary winding 8 and a secondary winding 9, both wound around a magnetic core 7 and electromagnetically coupled together. The switching device 3 is shown as a field-effect transistor (FET) having a drain D connected to one terminal 1a of the d.c. power supply 1 via the transformer primary 8, a source S connected to the other terminal 1b of the d.c. power supply, and a gate G connected to the switch control circuit 5.

The output rectifying and smoothing circuit 4 comprises a rectifying diode 10 connected to the transformer primary 9, and a smoothing capacitor 11 connected in parallel with the transformer primary via the rectifying diode. The transformer windings 8 and 9 being polarized as indicated by the dots in FIG. 1, the diode 10 is conductive when the FET 3 is off, and nonconductive when it is on. The capacitor 11 is connected between a pair of output terminals 12 and 13, which are shown connected to a load 14 to be powered.

Also connected between the converter output terminals 12 and 13 is a voltage detector circuit 15 for feeding back to the switch control circuit 5 a signal indicative of the departure of the converter output voltage from a predetermined value. The voltage detector circuit 15 usually comprises a voltage-dividing resistor, a source of a reference voltage, and a differential amplifier for providing an output proportional to the difference between the fraction of the converter output voltage and the reference voltage. In response to the output from the voltage detector circuit 15, the switch control circuit 5 turns the FET 3 on and off at a a rate required for holding the converter output voltage constant.

Figure 2:
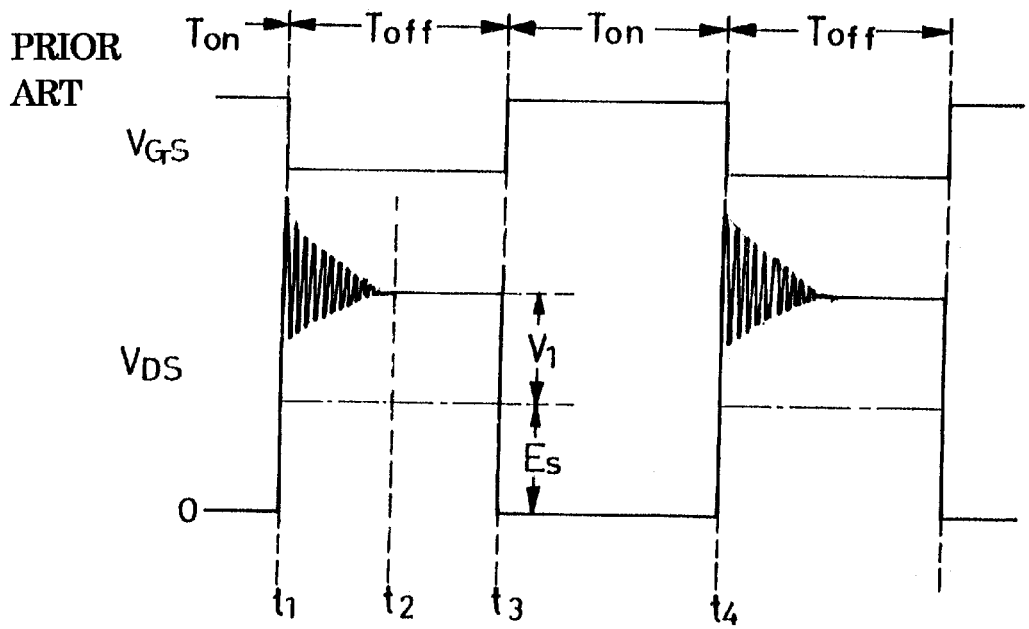
FIG. 2 is a diagram of waveforms useful in explaining the operation of the FIG. 1 prior art device.

The voltage waveform labeled $V_{GS}$ in FIG. 2 indicates the gate-source voltage of the FET 3, which voltage is equivalent to the output from the switch control circuit 5. Usually, the recurrence rate of this switch control circuit output is from 20 to 150 kilohertz. The voltage detector circuit 15 may be optically coupled to the switch control circuit 5.

The prior art surge suppressor circuit 6 is shown in FIG. 1 as comprising a diode 16, a capacitor 17 and a resistor 18 according to one of the preferred embodiments of the aforesaid Japanese utility model application. The capacitor 17 is connected in parallel with the transformer primary 8 via the diode 16, and the resistor 18 is connected in parallel with the capacitor 17. The diode 16 is so oriented as to be forward biased by the voltage that develops in the transformer primary 8 when the FET 3 is turned off Despite the showing of FIG. 1, however, the surge suppressor circuit 6 could be connected in parallel with the transformer primary 8 via the d.c. power supply 1 or, as another alternative, in parallel with the transformer secondary 9.

The FET 3 is turned on and off by controlling its gate-source voltage $V_{GS}$ by the output from the switch control circuit 5 as in FIG. 2 for powering the load 14 by this d.c.-to-d.c. converter. During each conducting period $T_{on}$ of the FET 3, a current will flow through the closed circuit comprising the power supply 1, transformer primary 8, and FET 3. Energy will thus be stored on the transformer core 7 since the rectifying diode 10 is nonconductive as aforesaid during each such period. The energy will be released during each nonconductive period $T_{off}$ of the FET 3, resulting in the buildup of a voltage across the transformer secondary 9 and hence in the conduction of the rectifying diode 10. Thus will the power be fed to the load 14, as well as to the smoothing capacitor 11.

As has been stated, a voltage surge will develop across the transformer primary 8, which is inductive, when the FET 3 is turned off while a current is flowing through the transformer primary. The surges can be so great that the FET 3 might be destroyed by the sum of the surge voltage and the voltage Es of the power supply 1 were it not for the surge suppressor circuit 6. This circuit is known to function as follows to absorb the surges.

The capacitor 17 of the surge suppressor circuit 6 is charged, with the polarity indicated in FIG. 1, during normal operation of the converter. The voltage $V_1$ across the transformer primary 8 becomes higher than the voltage $V_c$ of the capacitor 17 when the FET 3 is turned off, so that the diode 16 will become conductive to cause the capacitor 17 to absorb the surge voltage. The capacitor 17 will clamp the transformer primary voltage $V_1$ during conduction of the diode 16. The diode 16 will become nonconductive when the transformer primary voltage $V_1$ subsequently grows less than the capacitor voltage $V_c$. This capacitor voltage $V_c$ will drop gradually as the current discharged therefrom flows through the resistor 18, but will not become less than the transformer primary voltage $V_1$.

There are indicated by the broken lines in FIG. 1 the noted leakage inductance L and stray capacitance $C_1$ of the transformer primary 8, and the stray capacitance $C_2$ of the FET 3. In the following evaluation of this prior art converter the term "stray capacitance C" will be used to denote the sum of the stray capacitances $C_1$ and $C_2$.

Speaking equivalently, the leakage inductance L is in series with the transformer primary 8, and the stray capacitance C in parallel with the serial connection of the transformer primary and the leakage inductance. The inductance-capacitance resonance circuit, or ringing circuit, is thus created which causes the drain-source voltage $V_{DS}$ of the FET 3 to oscillate finely, as from $t_1$ to $t_2$ in FIG. 2. The stray capacitance C is significantly less than the capacitances of the surge-suppressing capacitor 17 and output-smoothing capacitor 11. The resonance frequency $f_o$ of the LC resonance circuit is defined as:

$$1/[2\pi\sqrt{(LC)}], \text{ or } 1/[2\pi(LC)^{1/2}].$$

Since the inductance L of the LC resonance circuit is in series with the transformer primary 8, the drain-source voltage of the FET 3 is the sum of the supply voltage Es, the transformer primary voltage $V_1$, and the voltage $V_r$ of the inductance L due to resonance.

Figure 3:
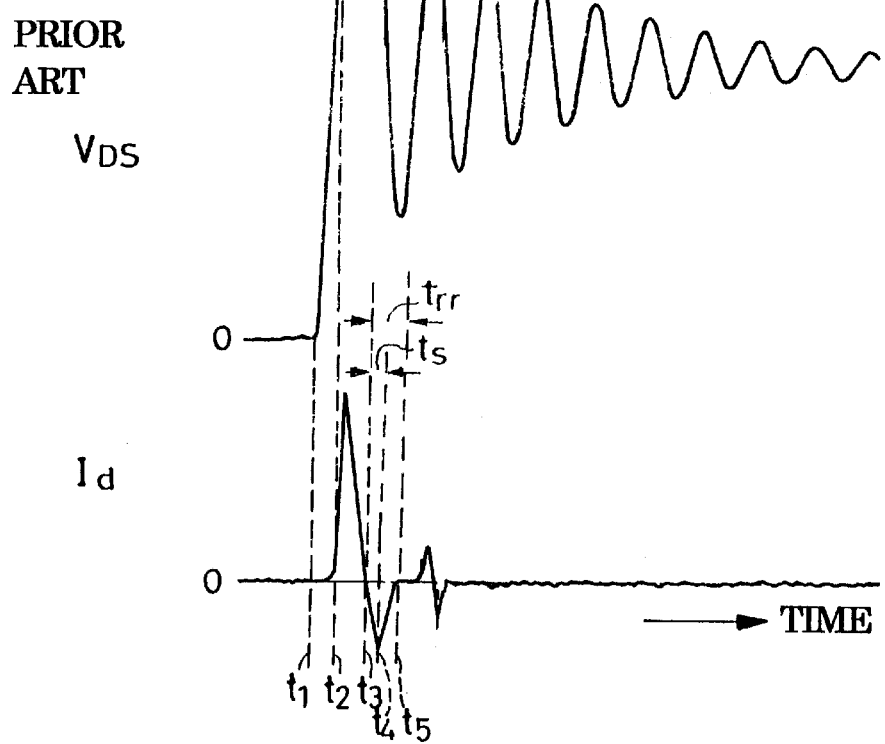
FIG. 3 is a diagram showing on an enlarged scale part of the FIG. 2 waveform of the drain-source voltage of the field-effect transistor employed as the switching device in the FIG. 1 prior art device, shown together with a current flowing through the diode of the surge suppressor circuit of the prior art device.

A study of FIG. 3 will further clarify what happens when the FET 3 is turned off. The waveform designated $V_{DS}$ in this figure is an enlargement of part of the FIG. 2 waveform of the drain-source voltage $V_{DS}$ of the FET 3, and the waveform $I_d$ is that of the current of the diode 16. The drain-source voltage $V_{DS}$ is shown to rise sharply, with the addition of the surge voltage, on being turned off at $t_1$ in FIG. 3. However, with the flow of the diode current $I_d$ as from $t_2$ to $t_5$, the surge voltage will be clamped by the voltage across the capacitor 17, so that the drain-source voltage $V_{DS}$ will be restricted.

The diode current $I_d$ is shown to flow forwardly from $t_2$ to $t_3$, and reversely from $t_3$ to $t_5$. The $t_3$–$t_5$ period is referred to as reverse recovery time $t_{rr}$, and the $t_3$–$t_4$ period as storage time $t_s$. Since the diode 16 can be considered practically conductive until the expiration of the reverse recovery time $t_{rr}$ it follows that the inductance-capacitance ringing circuit remains connected in parallel with the capacitor 17 via the diode 16 until the reverse recovery time terminates at $t_5$ limiting the surge.

The problem with the prior art, however, is that the reverse recovery time $t_{rr}$ of the diode 16 included in the surge suppressor circuit 6 is only 100 nanoseconds or so. As will be apparent from a comparison of the waveforms $V_{DS}$ and $I_d$ in FIG. 3, the resulting conduction period of the diode 16 is by no means sufficiently long to suppress the ringing to a practically acceptable level. Usually, the ringing cycle $T_1$, FIG. 3, is approximately 250 nanoseconds, and the ringing frequency approximately four megahertz. The ringing voltage constitutes high-frequency noise that must be cut down.

Embodiment of FIGS. 4–8

Figure 4:
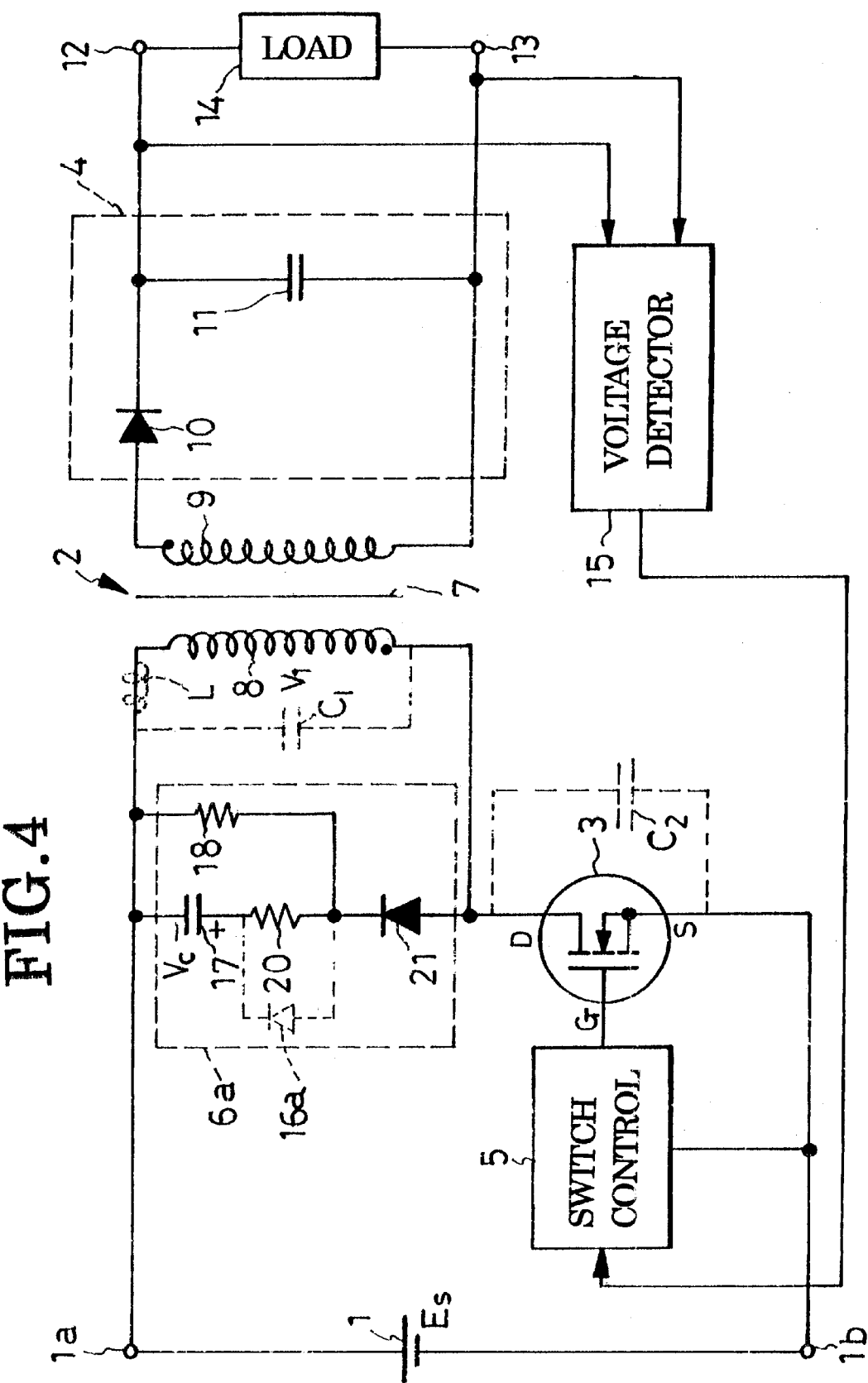
FIG. 4 is a schematic electrical diagram of the d.c.-to-d.c. converter built on the novel concepts of this invention.

FIG. 4 illustrates the d.c.-to-d.c. converter, built on the novel concepts of the present invention to overcome the weakness of the prior art discussed above. A comparison of this figure with FIG. 1 will reveal that the FIG. 4 converter is similar to the prior art device except for a surge suppressor circuit 6a which forms the gist of this invention. All the other parts and components of the inventive and prior art devices are alike, so that like reference characters are used to denote such like parts and components. No repeated explanation of these parts and components is considered necessary, except for the switch control circuit 5. which is shown in detail in FIG. 5.

Figure 5:
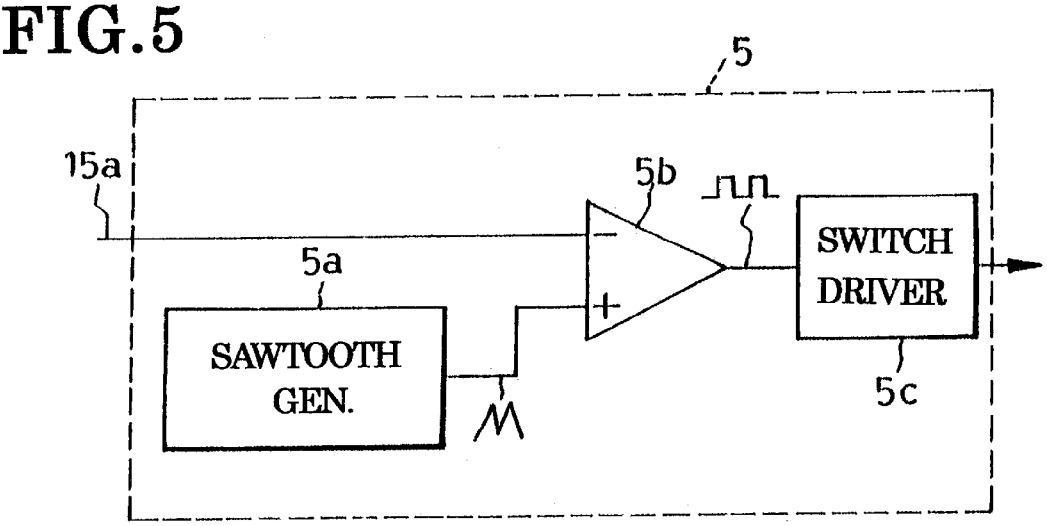
FIG. 5 is a block diagram of a switch control circuit in the FIG. 4 converter.

With reference therefore to FIG. 5 the switch control circuit 5 is therein shown to comprise a sawtooth generator 5a, a comparator 5b and a switch. driver circuit 5c. The sawtooth generator 5a generates a sawtooth voltage with a frequency somewhere in the range of 20 through 150 kilohertz. Comparing this sawtooth voltage and the converter output voltage signal from the voltage detector circuit 15 over the line 15a, the comparator 5b puts out a series of rectangular pulses for delivery to the switch driver circuit 5c, which then responds by turning the FET 3, FIG. 4, on and off accordingly. The switch control signal thus applied from switch control circuit 5 to FET 3 is shown as the gate-source voltage $V_{GS}$ in FIG. 6.

Referring back to FIG. 4, the surge suppressor circuit 6a according to the invention comprises a resistor 20 and a rectifying diode 21 in addition to the capacitor 17 and resistor 18 set forth in connection with the prior part. Since the surge suppressor circuit 6a has two resistors 18 and 20, the resistor 18 will be hereinafter referred to as the first resistor, and the resistor 20 as the second. The diode 21 bears the different reference numeral from the FIG. 1 diode 16 by reason of its longer reverse recovery time according to the invention. The capacitor 17 is connected in parallel with the transformer primary 8 via the second resistor 20 and diode 21, and the first resistor 18 in parallel with the capacitor 17 via the second resistor 20.

Designed to consume the energy of the ringing voltage of the transformer primary 8, the second resistor 20 is connected in series with both capacitor 17 and diode 21. The second resistor 20 may have its resistance value determined in a range of 10 through 330 ohms, 47 ohms in the illustrated embodiment, if the voltage Es of the d.c. power supply 1 is from 140 to 280 volts. Preferably, the resistance value of the first resistor 18 should be higher than that of the second resistor 20. This first resistor 18 might be dispensed with, but its presence is preferred for a greater latitude in determination of the discharge of the capacitor 17.

Like the prior art diode 16, the rectifying diode 21 of the improved surge suppressor circuit 6a is so oriented as to be forward biased by the voltage $V_1$ of the transformer primary 8 when the FET 3 is turned off. As a result, a serial circuit of the capacitor 17, second resistor 20 and diode 21 is connected in parallel with the transformer primary 8.

According to a feature of this invention, the reverse recovery time $t_{rr}$ of the diode 21 is longer than half the cycle $T_1$ of the ringing that would occur in the absence of the surge suppressor circuit 6a, and less than the minimum nonconducting period of the FET 3. By the term "the cycle of the ringing that would occur in the absence of the surge suppressor circuit 6a" is meant the cycle of the ringing component of the drain-source voltage $V_{DS,}$ FIG. 3, of the FET 3 of the FIG. 1 prior art d.c.-to-d.c converter. The phrase "minimum nonconducting period" means the shortest possible nonconducting period of the FET 3, which is tantamount to each nonconducting period of the FET when the same is being driven at the highest possible recurrence rate.

The ringing voltage that develops across the transformer primary 8 right after the FET 3 is turned off is as drawn in FIGS. 2 and 3 in conjunction with the prior art. It is defined as the voltage due to the resonance of the inductance-capacitance resonance circuit formed by the inductance L due to the leakage inductance of the transformer primary 8 when the FET 3 is off, and the resultant C of the stray capacitance $C_1$ of the transformer primary 8 and the stray capacitance $C_2$ of the FET 3. The frequency of this ringing voltage is much higher than the recurrence rate (e.g. 20 through 150 kilohertz) of the drive pulses applied to the gate of the FET 3.

A desirable reverse recovery time of the diode 21 is the $t_1$–$t_2$ period of FIG. 2 when the ringing is shown to occur due to the inductance-capacitance resonance. Normally, the ringing frequency is approximately four megahertz, the duration of the ringing approximately two and a half microseconds, the minimum nonconducting period of the FET 3 approximately seven microseconds, and the ringing cycle approximately 250 nanoseconds. From these statistics the reverse recovery time of the diode 21 according to the invention should be from about 125 nanoseconds to about seven microseconds, preferably from about 125 to about 1000 nanoseconds. Typically, as in the present embodiment of the invention, the diode reverse recovery time is 600 nanoseconds, which is far more than that (100 nanoseconds) of the prior art diode 16, FIG. 1, or of the output rectifying diode 10.

Figure 7:
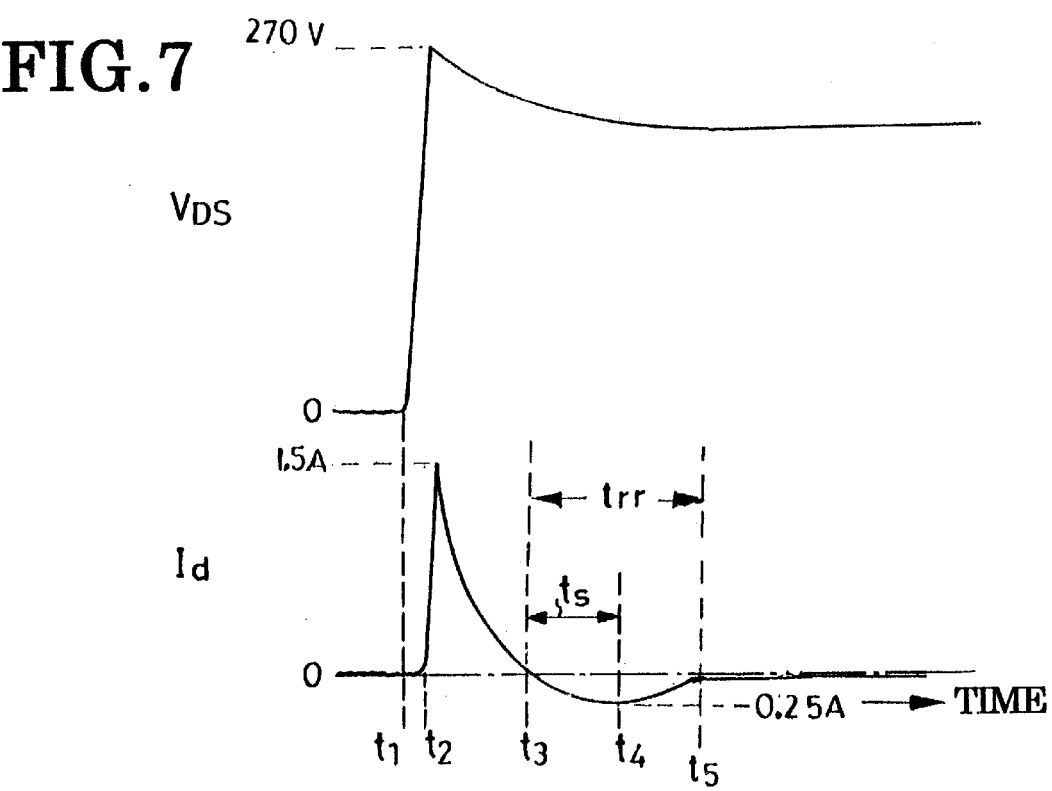
FIG. 7 is a waveform diagram similar to FIG. 3 but explanatory of the operation of the FIG. 4 device.

As indicated in FIG. 7. the reverse recovery time $t_{rr}$ of the diode 21 is hereby defined for the invention as the time from $t_3$, when the current $I_d$ of the diode 21 starts to flow reversely, to $t_5$ when the diode current drops to 10 percent of the reverse peak value at $t_4$. The peak of the forward current of the diode 21 is shown to be 1.50 amperes in FIG. 7, and that of the reverse current 0.25 ampere. The reverse recovery time terminates, therefore, when the reverse current lessens to 0.025 ampere, at $t_5$.

The storage time $t_s$ of the diode 21, included in its reverse recovery time $t_{rr}$, should be longer than half the cycle $T_1$ of the ringing voltage and less than the minimum nonconducting period of the FET 3. In practice the storage time $t_s$ may be from about 125 nanoseconds to about seven microseconds, preferably from about 125 to about 500 nanoseconds.

The diode 21 should be low in the peak value of the forward voltage $V_F$ rising when a forward current is made to flow stepwise therethrough. The particular diode used in the test model constructed according to the FIG. 4 embodiment was such that the peak value of the forward voltage $V_F$ rising when a ten-milliampere current was made to flow stepwise therethrough was 6.4 volts. The diode of the trademark "SARS 01," manufactured by Sanken electric Co., Ltd., of Japan is recommended for use as the diode 21 meeting all the requirements set forth above.

It is no doubt noteworthy that the reverse recovery time of the diode 21 is dependent upon the capacitance of the capacitor 17: The reverse recovery time is in inverse proportion to the capacitance. Thus, in event the reverse recovery time of the diode available for use falls short of a desired value, a capacitor of matching capacitance may be employed. The capacitor 17 in this embodiment of the invention can be somewhere between 0.0005 and 0.0150 microfarad in capacitance.

Operation of FIGS. 4–8 Embodiment

Figure 6:
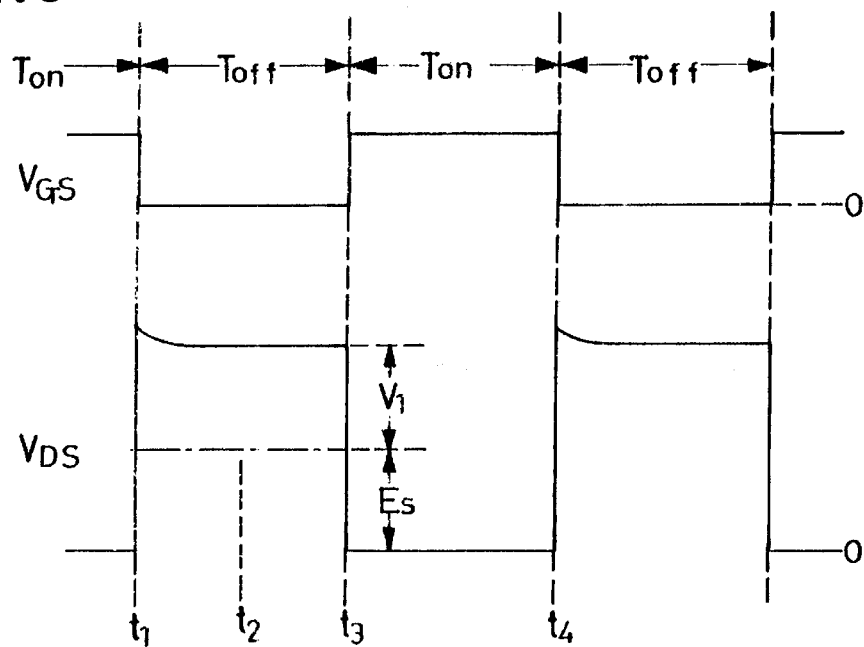
FIG. 6 is a waveform diagram similar to FIG. 2 but explanatory of the operation of the FIG. 4 device according to the invention.

Inputting the converter output voltage signal from the voltage detector circuit 15, the switch control circuit 5 will turn the FET 3 on and off by controlling its gate-source voltage $V_{GS}$ as in FIG. 6. Electric energy will be stored on the transformer 2 during the conducting periods $T_{on}$ of the FET 3, and released and fed to the load 14, as well as to the capacitor 11, during its nonconducting periods $T_{off}$. The feedback control of the converter output voltage takes place as in the prior art device of FIG. 1. The operation of the FIG. 4 embodiment differs from that of the FIG. 1 device only in how the surge is attenuated without production of high-frequency noise due to ringing.

A voltage surge will sweep through the transformer primary 8 when the FET 3 is turned off as at $t_1$ in FIG. 6. However, with the conduction of the diode 21 of the improved surge suppressor circuit 6a, a forward current of 1.5 amperes or so will flow through the diode 21 into the capacitor 17, as indicated at $I_d$ in FIG. 7. The capacitor 17 will thus suppress the surge, keeping the drain-source voltage $V_{DS}$ of the FET 3 from rising inordinately high.

A reverse voltage will be impressed to the diode 21 with the rise of the voltage across the capacitor 17 due to the absorption of the surge voltage. The diode 21 will remain conductive in the face of the reverse voltage because it has stored therein the minority carriers of the forward current that flowed therethrough during the surge absorption by the capacitor. There will therefore be a reverse flow of the diode current $I_d$ as from $t_3$ to $t_5$ in FIG. 7.

The $t_3$–$t_5$ period in FIG. 7 is the reverse recovery time $t_{rr}$, of which the $t_3$–$t_4$ period is the storage time $t_s$. The stray capacitance C, set forth in connection with the FIG. 1 prior art device, is connected, so to say, in parallel with the capacitor 17 via the diode 21 and resistor 20 during the reverse recovery time $t_{rr}$, preventing the formation of a high-frequency resonance circuit due to the inductance and capacitance associated with the transformer primary 8. Only a lower-frequency resonance circuit is created instead. No ringing of the transformer primary voltage will occur. The drain-source voltage $V_{DS}$ of the FET 3 will rise at $t_1$ in FIG. 6 with the low surge voltage and immediately start dwindling until it levels off shortly before $t_2$ in FIG. 6. The peak of the FET drain-source voltage $V_{DS}$ right after $t_1$ in both FIGS. 6 and 7 is lower than in the FIG. 1 prior art device thanks to the use of the diode 21 which is lower in the resistance and voltage $V_F$ during the rise of the forward current.

Figure 8:
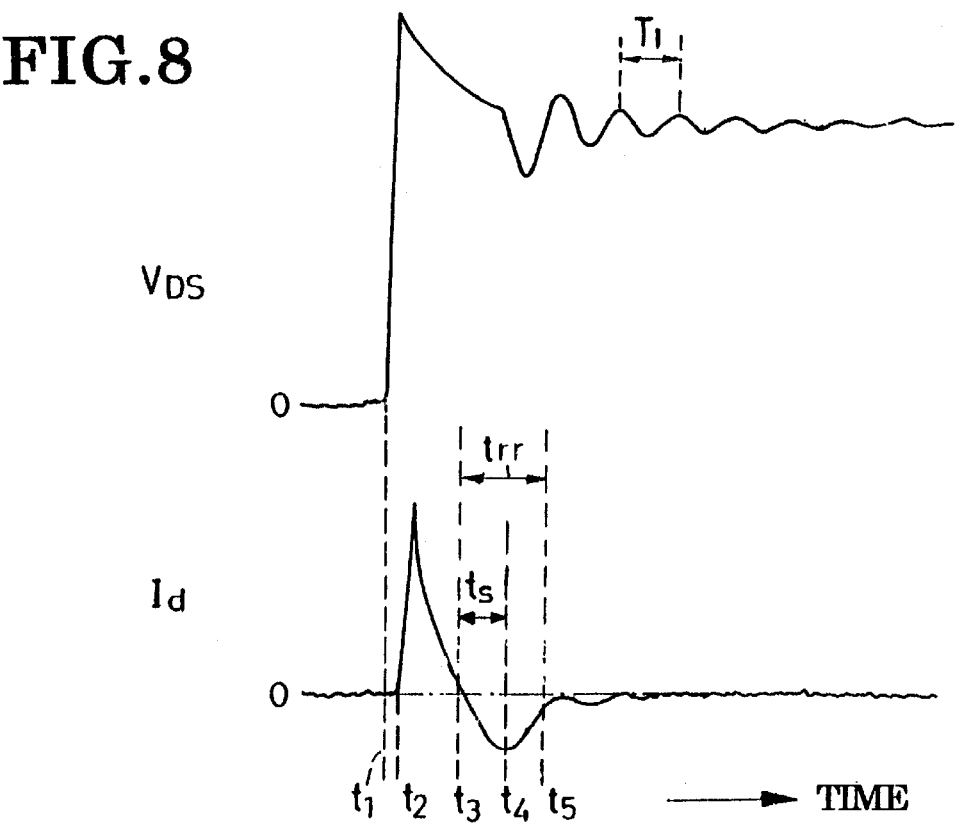
FIG. 8 is a waveform diagram similar to FIG. 7 but explanatory of the operation of the FIG. 4 device in the case where the reverse recovery time of the diode is made shorter than in FIG. 7 within the scope of this invention.

FIG. 8 represents the variations with time of the FET drain-source voltage $V_{DS}$ and diode current $I_d$ in the case where the diode 21 in use has a storage time $t_s$ of, say, 150 nanosecnds and a reverse recovery time $t_{rr}$ of 300 nanoseconds, which are less than those indicated in FIG. 7. Ringing will occur in this case, but at a much lower level than in the FIG. 1 prior art converter.

It is thus seen that the FIG. 4 embodiment overcomes the shortcomings of the prior art and gains the advantages set forth previously. Additionally, during the conduction of the diode 21 in its reverse recovery time $t_{rr}$, a current will flow through the closed circuit of the capacitor 17, resistor 20, diode 21, and transformer primary 8, in a direction opposite to that of current flow when the FET 3 is on. The energy discharged from the capacitor 17 will thus be recovered in part by the transformer 2 for higher operating efficiency.

Figure 10:
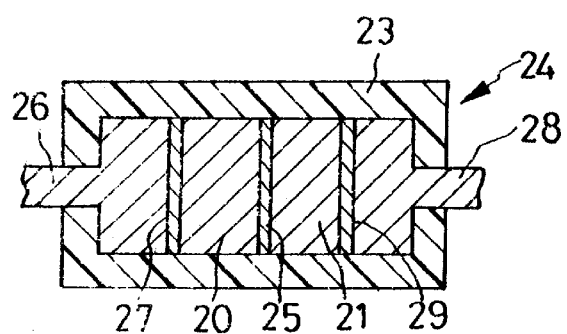
FIG. 10 is a section through a diode-resistor assembly suitable for use in the FIG. 9 converter.
Figure 9:
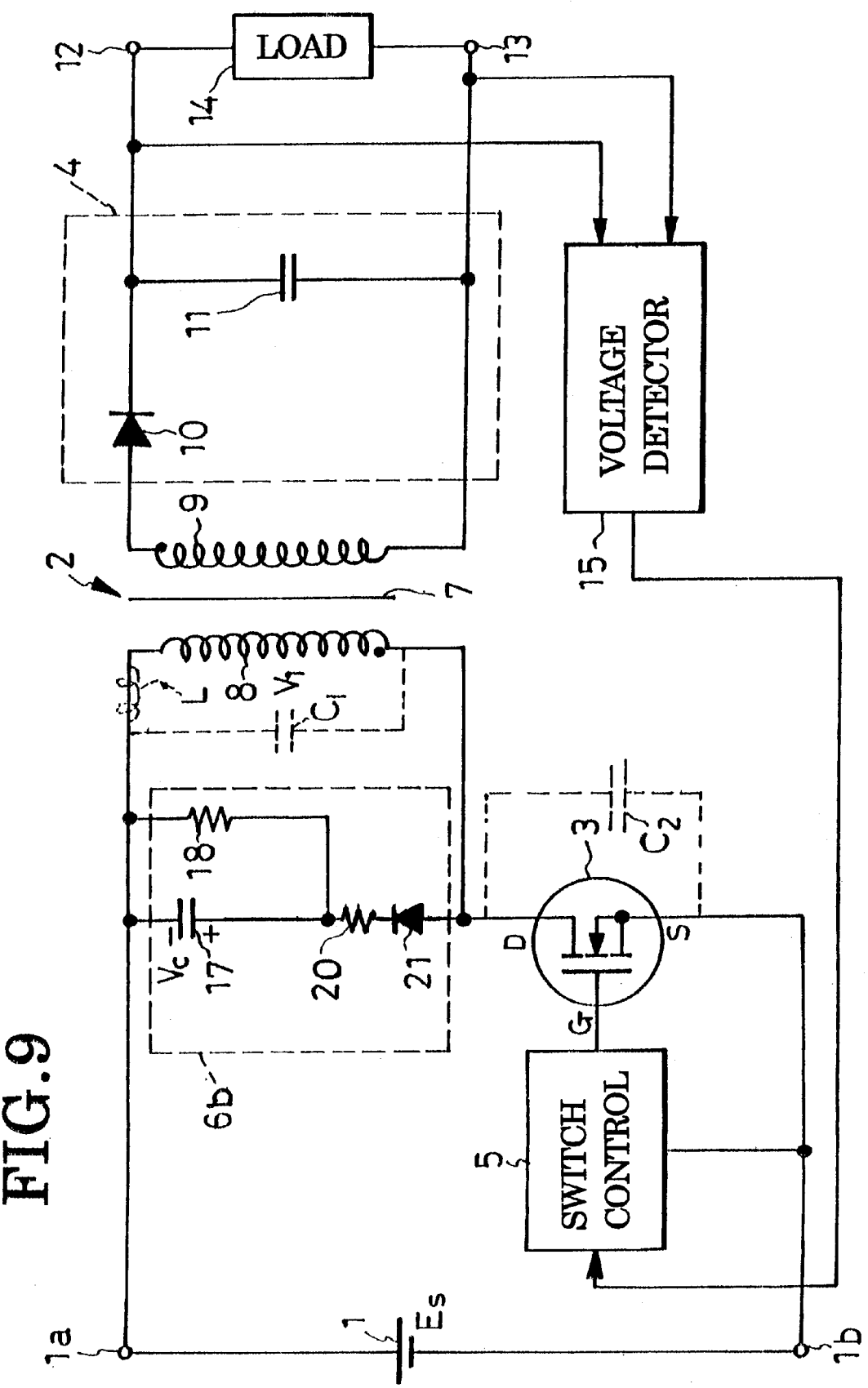
FIG. 9 is a schematic electrical diagram of another preferred form of d.c.-to-d.c. converter according to the invention.

Embodiment of FIGS. 9 and 10

The d.c.-to-d.c. converter of FIG. 9 features a modified surge suppressor circuit 6b, the converter itself being identical with that of FIG. 4 in the other details of construction. Electrically, the modified surge suppressor circuit 6b differs from its FIG. 4 counterpart 6a only in that the first resistor 18 is connected directly in parallel with the capacitor 17, that is, without the interposition of the second resistor 20 as in the FIG. 4 circuit. The second resistor 20 is connected in series with both capacitor 17 and first resistor 18.

Mechanically, the modified surge suppressor circuit 6b has another difference: The second resistor 20 and the diode 21 are combined into one component shown in FIG. 10 and therein generally designated 24. The resistor-diode combination 24 has a resistor chip 20 and a semiconductor diode chip 21 which are brazed together at 25. The resistor chip 20 is electrically connected to one terminal 26 by brazing 27, and the diode chip 21 to another terminal 28 by brazing 29. A plastic encapsulation 23 envelops all of the resistor-diode combination 24 but parts of the terminals 26 and 28.

The operation of this FIG. 9 surge suppressor circuit 6b, having the connections of the resistors 18 and 20 modified as shown, is akin to that of the FIG. 4 circuit 4a. The integration of the resistor 20 and diode 21 into one component 24 is intended for greater ease of assemblage, and size and cost reduction, of the converter.

Figure 11:
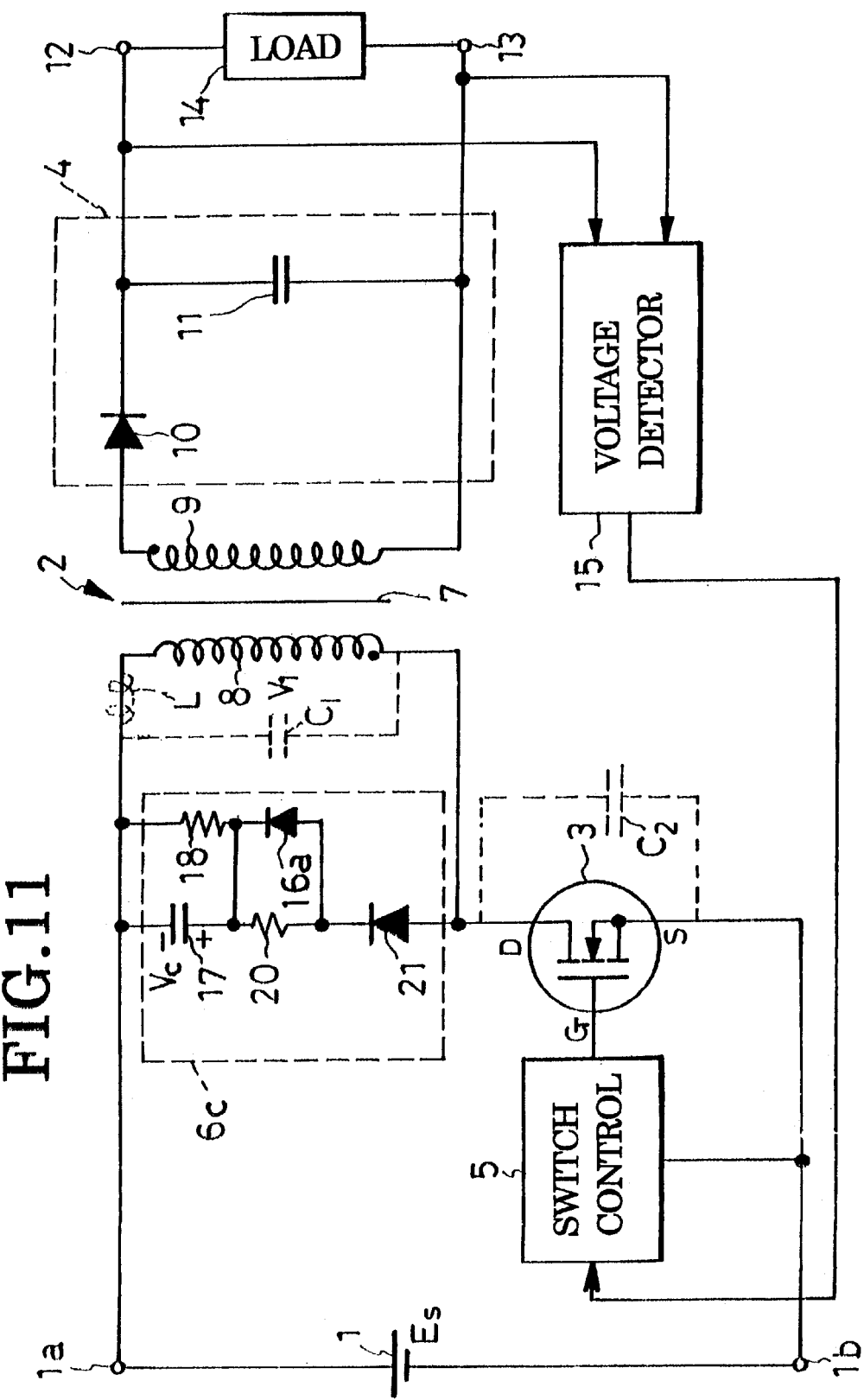
FIG. 11 is a schematic electrical diagram of still another preferred form of d.c.-to-d.c. converter according to the invention.

Embodiment of FIG. 11

In FIG. 11 is shown another d.c.-to-d.c. converter featuring another modified surge suppressor circuit 6c. This FIG. 11 embodiment is also identical with that of FIG. 4 in the other details of construction.

The modified surge suppressor circuit 6c has a second rectifying diode 16a in addition to the first disclosed diode 21. The circuit 6c is similar to the FIG. 4 circuit 6a in having a serial connection of the capacitor 17, second resistor 20, and first diode 21; only, the first resistor 18 is connected directly in parallel with the capacitor 17 as in the FIG. 9 circuit 6b. The second diode 16a is connected in parallel with the second resistor 20. The second diode 16a is less in both storage time $t_s$ and reverse recovery time $t_{rr}$ than the first diode 21 and possesses the same electric characteristics as the FIG. 1 prior art diode 16.

Operation of FIG. 11 Embodiment

The two diodes 16a and 21 of the surge suppressor circuit 6c are both rendered conductive by the voltage across the transformer primary 8 when the FET 3 is turned off. The surge current will flow through these conductive diodes into the capacitor 17. It is thus seen that the second diode 16a is designed to provide a bypass around the second resistor 20.

Both diodes 16a and 21 will become reverse-biased when the voltage $V_c$ across the capacitor 17 rises subsequently through absorption of the. The second diode 16a will become nonconductive sooner than the first diode 21 because of its shorter storage time and reverse recovery time. Remaining conductive longer than the second diode 16a, the first diode 21 will form a serial circuit with the capacitor 17 and second resistor 20, which circuit is connected in parallel with the transformer primary 8, preventing the transformer primary voltage $V_1$ from ringing.

Thus the FIG. 11 embodiment offers the same advantages as does the FIG. 4 embodiment. Additionally, as the second diode 16a provides a bypass around the resistor 20, the capacitor 17 will absorb the surge more quickly.

Figure 12:
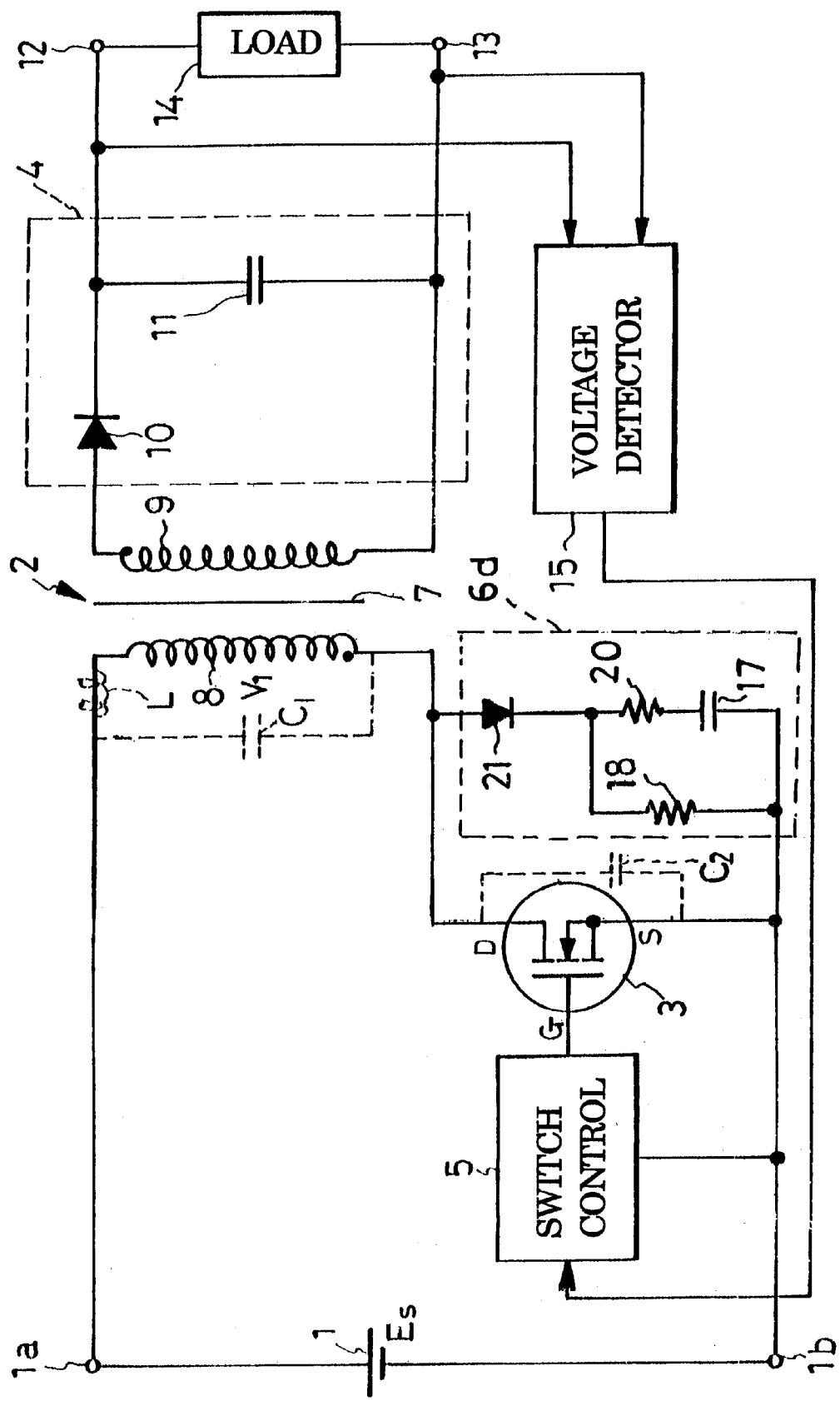
FIG. 12 is a schematic electrical diagram of a further preferred form of d.c.-to-d.c. converter according to the invention.

Embodiment of FIG. 12

In a further preferred embodiment of the invention shown in FIG. 12, a surge suppressor circuit 6d is connected in parallel with the FET 3, the other details of construction being as set forth above with reference to, FIG. 1 or 4. The surge suppressor circuit 6d is per se shown to be of the same construction as that of FIG. 4.

Besides being connected in parallel with the FET 3, the surge suppressor circuit 6d is in parallel with the transformer primary 8 via the d.c. power supply 1. In terms of an alternating current, therefore, the surge suppressor circuit 6d can be thought of as being in parallel with the transformer primary 8, so that the surge suppressor circuit functions just like the FIG. 4 surge suppressor circuit 6a.

It may be pointed out in connection with the operation of the FIG. 12 device that the ringing of the transformer primary voltage $V_1$ is inhibited as the capacitor 17 is connected in parallel with the serial connection of the power supply 1 and transformer primary 8 during the reverse recovery time of the diode 21 following the absorption of the surge voltage by the capacitor 17.

Not just the FIG. 4 surge suppressor circuit 6a, as in this FIG. 12 embodiment, but also the FIG. 9 surge suppressor circuits 6b and FIG. 11 surge suppressor circuit 6c could also be connected in parallel with the FET 3.

Figure 13:
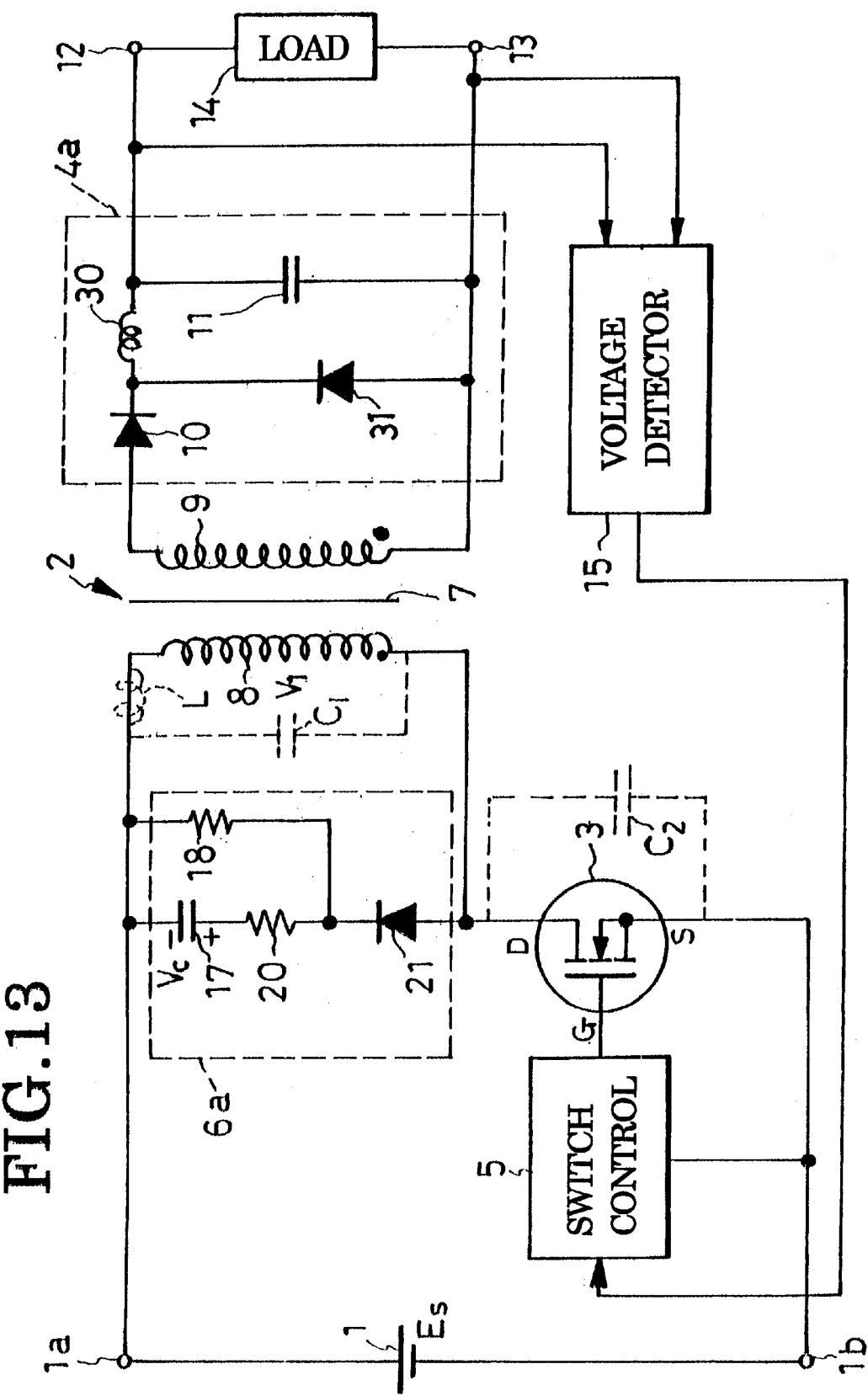
FIG. 13 is a schematic electrical diagram of a still further preferred form of d.c.-to-d.c. converter according to the invention.

Embodiment of FIG. 13

The d.c.-to-d.c. converter of FIG. 13 includes a modified output rectifying and smoothing circuit 4a and has the transformer secondary 9 reversed in polarity. All the other details of construction, including the surge suppressor circuit 6a, are as set forth previously, in connection with FIG. 1 or 4.

The FIG. 13 device is therefore a so-called forward one, power being fed from the transformer secondary 9 to the load 14 and capacitor 11 when the FET is on. In conformity with this reversed polarity of the transformer secondary 9, the output rectifying and smoothing circuit 4a incorporates a reactor 30 and a second rectifying diode 31 in addition to the first disclosed rectifying diode 10 and the smoothing capacitor 11. The reactor 30 is connected between first diode 10 and capacitor 11, and the second diode 31 in parallel with capacitor 11 and reactor 30.

This final embodiment is meant to illustrate that the surge suppressor circuit 6a is applicable to the forward d.c.-to-d.c. converter of the illustrated construction as well. The same holds true with the surge suppressor circuits 6b, 6c and 6d of FIGS. 9, 11 and 12.

Possible Modifications

Despite the foregoing detailed disclosure it is not desired that the present invention be limited by the exact showing of the drawings or by the description thereof. The following is a brief list of possible modifications, alterations and adaptations of the illustrated embodiments which are all intended in the above disclosure and so believed to fall within the scope of the invention:

1. The surge suppressor circuits 6a, 6b and 6c could be connected in parallel with the transformer secondary. Even then, the transformer secondary being electromagnetically coupled to the primary, the surge suppressor circuit would still be connected in parallel with the transformer primary in terms of an alternating current. All that is required for the functioning of the surge suppressor circuit is that it be connected in parallel with the transformer primary either directly or indirectly.

2. The transformer 2 could be replaced by an autotransformer having but one continuous winding that is tapped.

3. The transformer in use could have a tertiary winding for powering the switch control circuit.
4. The FET 3 could be replaced by other electronic switching devices such for example as a bipolar transistor.
5. A current detecting resistor could be connected in series with the switching device 3 for current feedback control.
6. The switch control circuit 5 could be modified for on-off control of the switching device 3 in some different way.
7. The diode 16a of the FIG. 11 embodiment could be employed in that of FIG. 4, too, as indicated by the broken lines.
8. A switching device could be connected in parallel with the diode 10 of the rectifying and smoothing circuit 4 in the FIG. 12 embodiment, to be turned on in synchronism with the conduction of the diode 10. Likewise, in the FIG. 13 rectifying and smoothing circuit 4a, a switching device could be connected in parallel with each of the diodes 10 and 31, also to be turned on with the conduction of the diode. A voltage drop at the rectifying and smoothing circuit would lessen significantly in this manner.
9. A battery or the like could be employed as the d.c. power supply 1.
10. The invention might be applied to a self-excited d.c.-to-d.c. converter such as a ringing choke converter.

What is claimed is:

1. A d.c.-to-d.c. converter for feeding a load from a d.c. power supply, comprising:
   (a) a switching device to be connected across a d.c. power supply, the switching device having a stray capacitance;
   (b) a transformer having a winding to be connected across the d.c. power supply via the switching device, the transformer winding having a leakage inductance and a stray capacitance;
   (c) a rectifying and smoothing circuit connected to the transformer for rectifying and smoothing an output therefrom;
   (d) a control circuit for turning the switching device on and off in order to provide a converter output voltage; and
   (e) a surge suppressor circuit having a serial connection of a surge-absorbing capacitor and a rectifying diode and a resistor, which serial connection is connected in parallel with the winding of the transformer, for absorbing a surge voltage developing in the transformer winding each time the switching device is turned off, the rectifying diode having a predetermined reverse recovery time that is longer than half the cycle of a ringing voltage developing in the transformer winding owing to the leakage inductance and stray capacitance of the transformer winding and to the stray capacitance of the switching device and shorter than an expected minimum nonconducting period of the switching device.

2. The d.c.-to-d.c. converter of claim 1 wherein the reverse recovery time of the rectifying diode of the surge suppressor circuit is from about 125 nanoseconds to about seven microseconds.

3. The d.c.-to-d.c. converter of claim 1 wherein the surge suppressor circuit further comprises a second resistor connected in parallel with the capacitor for permitting the capacitor to discharge therethrough.

4. The d.c.-to-d.c. converter of claim 1 wherein the resistor of the surge suppressor circuit is connected between the capacitor and the diode, and wherein the surge suppressor circuit further comprises a second resistor connected in parallel with the serial connection of the capacitor and the first recited resistor, for permitting the capacitor to discharge therethrough.

5. The d.c.-to-d.c. converter of claim 4 wherein the surge suppressor circuit further comprises a second diode connected in parallel with the first resistor, the second diode being shorter in reverse recovery time than the first recited diode.

6. The d.c.-to-d.c. converter of claim 1 wherein the resistor and the diode of the surge suppressor circuit are fabricated in combination as a single component.

7. The d.c.-to-d.c. converter of claim 1 wherein the resistor of the surge suppressor circuit has a resistance value ranging from about 10 to about 330 ohms in the case where the d.c. power supply has a voltage ranging from about 140 to about 280 volts.

8. The d.c.-to-d.c. converter of claim 1 wherein the surge suppressor circuit is connected in parallel with the switching device.

9. A d.c.-to-d.c. converter for feeding a load from a d.c. power supply, comprising:
   (a) a switching device to be connected across a d.c. power supply, the switching device having a stray capacitance;
   (b) a transformer having a primary winding to be connected across the d.c. power supply via the switching device, and a secondary winding electromagnetically coupled to the primary winding, the transformer primary winding having a leakage inductance and a stray capacitance;
   (c) a rectifying and smoothing circuit connected to the transformer secondary winding for rectifying and smoothing an output therefrom, the rectifying and smoothing circuit having a pair of output terminate between which is to be connected a load;
   (d) a voltage detector circuit connected between the output terminals of the rectifying and smoothing circuit for providing an output indicative of a departure of an output voltage of the converter from a reference value;
   (e) a control circuit connected between the voltage detector circuit and the switching device for turning the latter on and off at a rate depending upon the output from the former in order to provide a converter output voltage; and
   (f) a surge suppressor circuit having a serial connection of a surge-absorbing capacitor and a rectifying diode and a resistor, which serial connection is connected in parallel with the primary winding of the transformer, for absorbing a surge voltage developing in the transformer primary winding each time the switching device is turned off, the rectifying diode having a predetermined reverse recovery time that is longer than half the cycle of a ringing voltage developing in the transformer primary winding owring to the leakage inductance and stray capacitance of the transformer primary winding and to the stray capacitance of the switching device and shorter than an expected minimum nonconducting period of the switching device.

10. The d.c.-to-d.c. converter of claim 9 wherein the reverse recovery time of the rectifying diode of the surge suppressor circuit is from about 125 nanoseconds to about seven microseconds.

* * * * *

UNITED STATES PATENT AND TRADEMARK OFFICE
CERTIFICATE OF CORRECTION

PATENT NO. : 6,272,024 B1
DATED : August 7, 2001
INVENTOR(S) : Akihiro Uchida

It is certified that error appears in the above-identified patent and that said Letters Patent is hereby corrected as shown below:

Column 1,
Line 60, the period "." after "high" is not in the application.

Column 2,
Line 34, "microsecond" should be -- microseconds --.
Line 51, the comma "," after "recovery" is not in the application.
Line 66, "coverter" should be -- converter --.

Column 5,
Line 66, the "," after "converter" is not in the application.

Column 6,
Line 28, "prior part" should be -- prior art --.

Column 8,
Line 49, "nanosecnds" should be -- nanoseconds --.

Column 9,
Line 50, insert -- surge -- after "the".

Column 12,
Line 38, "terminate" should be -- terminals --.
Line 57, "owring" should be -- owing --.

Signed and Sealed this

Fifth Day of March, 2002

*Attest:*

JAMES E. ROGAN
*Director of the United States Patent and Trademark Office*

*Attesting Officer*